Oct. 6, 1970 E. O. OLSEN 3,533,100
BALANCING APPARATUS FOR CONVERSION OF DIGITAL INFORMATION INTO ANALOG FORM
Filed March 13, 1967 3 Sheets-Sheet 1

INVENTOR.
EVERETT O. OLSEN
BY David E. Hoppe
ATTORNEY

INVENTOR.
EVERETT O. OLSEN
BY David E. Hoppe
ATTORNEY

INVENTOR.
EVERETT O. OLSEN
BY David E. Hoppe
ATTORNEY

United States Patent Office 3,533,100

Patented Oct. 6, 1970

3,533,100
BALANCING APPARATUS FOR CONVERSION OF DIGITAL INFORMATION INTO ANALOG FORM

Everett O. Olsen, Wrentham, Mass., assignor to The Foxboro Company, Foxboro, Mass., a corporation of Massachusetts Filed Mar. 13, 1967, Ser. No. 622,577
Int. Cl. H03k *13/02*
U.S. Cl. 340—347 8 Claims

ABSTRACT OF THE DISCLOSURE

Each of a plurality of fingers, which represent a plurality of bits of a binary number, may be enabled to transfer a predetermined finger pressure to a force bar and bellows balancing system; the transfer is enabled when the binary bit for the transferring finger is a "one"; a bit "zero" causes removal of the finger clear of the force bar; bits encoded as frequencies may be sent along a two-wire transmission system to a decoding section which then distributes each of the plurality of bit signals to respective finger enablers.

When an industrial process is to be controlled with the use of a central processing system, it is commonly required that process valves be positioned in accordance with processor calculations. The valve operator is preferably an air-operated device, such as the commonly employed pneumatic diaphragm operator, for reasons of reliability, efficient power, transfer, and rapid response to valve position demands. In many present applications, the result of the central processor calculation, which is in digital form, is converted to an electrical analog signal in a step prior to conversion of the electrical analog signal to an equivalent pneumatic signal. This pneumatic analog signal is employed to actuate the pneumatic valve operator. Some means of holding the valve position between successive calculations is also incorporated.

The present invention proposes a simplification of valve control by employing means to convert the digital calculation performed by the central processor into a pneumatic signal suitable for controlling a pneumatic valve operator. Such a simplification thereby offers the advantages of a reduced number of components in each valve control loop with attendant improved reliability.

Briefly stated, the invention employs a balanced force bar system having on one side applied thereto a force which is the summation of the weight of all the bits in the binary number corresponding to the commanded valve position; each bit of this binary number enables its respective component which applies a force representative of its bit weight to the force bar when the bit is a binary "one"; for bit "zero" the respective bit component disables transfer of its bit weight to the force bar. An air nozzle and bellows arrangement is operative with the other side of the force bar, functioning with an air amplifier system for rebalancing of the force bar; the required rebalancing force is a measure of the summed weight of the digital bits, and is an analog equivalent of the binary number representing the valve position command. Its pneumatic rebalancing force, taken from the output of an air amplifier, may be supplied directly to a conventional pneumatic valve operator. A two-wire transmission system for the plurality of bits makes location of the converter more flexible.

Other features and advantages of this invention may be seen in part from the specification below and in part from the figures herewith in which.

Figure 1:
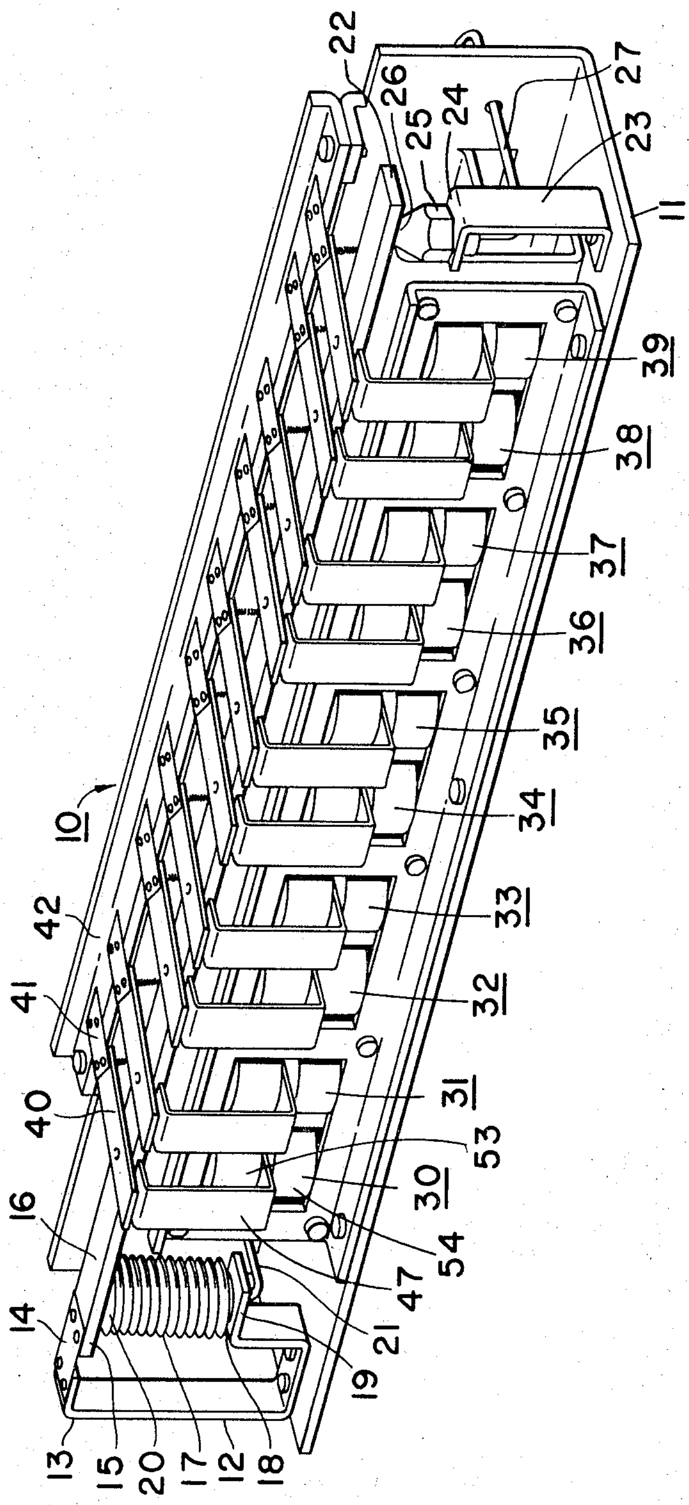
FIG. 1 is a three-dimensional view of an embodiment of the invention.

Referring to FIG. 1, converter 10 includes a rigid base member 11 for supporting various components thereon in operative relationship. Flexure bracket 12 is mounted at one end of base 11. Flexure bracket 12 has an upper portion 13 thereof to which is attached by convenient means to one end of flexure 14. To the other end of flexure 14 is attached one end 15 of rigid force bar 16 in a manner to orient the long dimension of force bar 16 along the longest dimension of base 11. Flexure 14 thereby pivotally connects force bar 16 to flexure bracket 12.

Bellows 17 is fixedly mounted at end 18 thereof to extension 19 of bracket 12, which thereby serves as a rigid base mounting for end 18 of bellows 17. The other end 20 of bellows 17 is positioned against force bar 16 near end 15 thereof so that pivotal movement of force bar 16 on flexure 14 varies the length of bellows 17 between ends 18 and 20 thereof. Pneumatic bellows supply line 21 is conveniently connected through extension 19 of bracket 12 and into end 18 of bellows 17; thereby the pressure in bellows supply line 21 is communicated to the interior of bellows 17. Bellows 17 exerts a force at end 20 thereof against force bar 16 which is proportional to the pressure provided to the interior of bellows 17 by bellows supply line 21. Pneumatic bellows supply line 21 is conveniently run through the rear of converter 10 and may be connected therefrom to the output of an air amplifier as discussed below.

Near end 22 of force bar 16, which is opposite end 15, is disposed nozzle mounting bracket 23 attached to base 11. At the upper end 24 of bracket 23 is disposed nozzle 25, positioned to permit its orifice 26 to abut force bar 16 near end 22 thereof. With this arrangement, movement of force bar 16 on its pivot at flexure 14 varies the distance between force bar 16 and orifice 26 of nozzle 25. Nozzle supply line 27 is attached through end 24 of bracket 23 to nozzle 25. Nozzle supply line 27 is conveniently run through the rear of base 11 and may be connected to the nozzle connection of an air amplifier as discussed below. The flow through pneumatic nozzle supply line 27 passes through nozzle 25 exiting at orifice 26 thereof. The exit flow from orifice 26 is throttled by force bar 16, the degree of throttling being determined by the distance between force bar 16 and orifice 26.

Disposed along the length of force bar 16 are illustratively ten bit assemblies 30 through 39, each being similar in construction. Description is made with reference to bit assembly 30, it being understood that bit assemblies 31 through 39 are similar.

Figure 2:
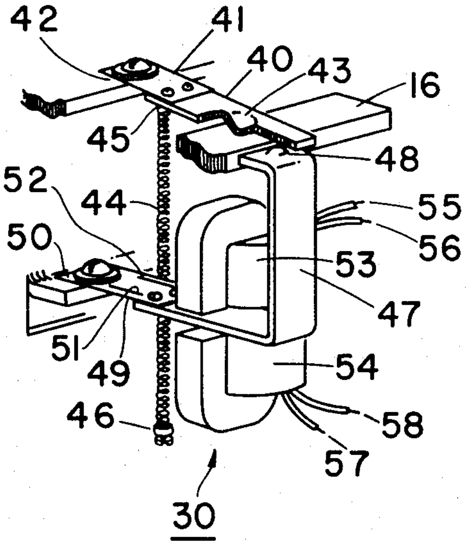
FIG. 2 is a three-dimensional view of a single bit assembly.

Referring to FIGS. 1 and 2, bit weighting finger 40 is attached at one end thereof by flexure 41 to a rear bar 42 attached to an upper portion of base 11. Bit weighting finger 40 is thereby disposed so that a downwardly projecting protuberance 43 therefrom, which may be in the form of a dap or dimple, may transfer force from finger 40 to a contacted part of force bar 16. The force to be thereby transferred is determined by the tension of spring 44 which is attached at one end to spring holder 45 on finger 40, and attached at the other end to zero adjust member 46 rigidly mounted to a lower portion of base 11. Spring 44 may be adjusted by zero adjustment 46 to transfer a desired force through dimple 43 to force bar 16.

Such transfer of force from bit weighting finger 40 to force bar 16 is permissible only when toggle bar 47 is in its downward position, thereby lowering dimple 48 on toggle bar 47, sufficiently downwards to withdraw dimple 48 from contact with the underside of finger 40, thereby leaving dimple 43 of finger 40 as the only restraint against the movement of finger 40 urged by spring 44. Toggle bar 47 is attached by two-positioned snap 49 to a rear portion 50 of base 11. Snap 49 is constructed of a flexible material and has two cuts 51 and 52 therein to facilitate the two-position function of toggle bar 47. When toggle member 47 is in its upward position, dimple 48 at the upper end thereof contacts the underside of finger 40 and thereby lifts it sufficiently upwards to clear dimple 43 of finger 40 from contact with force bar 16. Thus, in the upward position of toggle member 47, the influence of finger 40 is completely removed from affecting force bar 16.

Illustratively, magnet structure 53 is employed to actuate toggle bar 47 to its upward position, and magnet structure 54 is employed to actuate toggle bar 47 to its downward position. Being in either position, toggle bar 47 remains so until the magnet structure 53 or 54 determining the alternate position is energized, which may be by a momentary pulse.

Each magnet structure consists of a winding on a magnetic core. Magnet structures 53 and 54 are held in position be means of magnet frame 59 attached to base 11, which accommodates all the magnet structures 53 and 54 associated with bit assemblies 30 through 39. Leads 55 and 56 from magnet structure 53 may be conveniently terminated at plug assembly 60 mounted to the rear of base 11, and leads 57 and 58 from magnet structure 54 may be similarly run to plug assembly 60.

When a particular bit finger 40 of bit assemblies 30 through 39 is allowed to contact force bar 16, the force transferred thereby represents a binary "one" for its digit. Conveniently, the bit assembly 30 nearest bellows 17 is representative of the least significant digit of the ten bit binary number corresponding to the ten bit assemblies 30 through 39. In a hypothetical situation where all pressures from spring 44 tensions were equal, the pressure from finger 40 of bit assembly 30 would have the least effect upon force bar 16. Similarly, bit weighting assembly 39 conveniently represents the most significant digit, being nearest nozzle 25 and the leverage thereby achieved productive of greater effect upon force bar 16 for a situation wherein all spring tensions were equal. To represent a binary number the condition of equal spring 44 tensions would require that bit assemblies 30 through 39 be spaced in a binary progressive manner so that each successive bit assembly starting from assembly 30 would provide twice the effective pressure as the one proceeding it. For purposes of manufacturing convenience and obtaining a practical size of converter 10, each bit assembly 30 through 39 is more or less evenly spaced along force bar 16, or irregularly in groups. It is thus necessary to vary the spring tensions of springs 44 respectively in each bit assembly 30 through 39 in order to provide a weighting affect on force bar 16 for each finger 40 which is double that transferred by finger 40 of the preceding lower-numbered bit assembly 30 through 39.

A converter of FIG. 1 may be employed in a valve positioning application by substituting for bellows 17 therein means for transferring a force to force bar 16, in a direction opposing the forces applied by fingers 40, which is proportional to the mechanical displacement of an actuated valve. Such an application eliminates the separate valve positioning means usually required with a pneumatic valve actuator.

Figure 3:
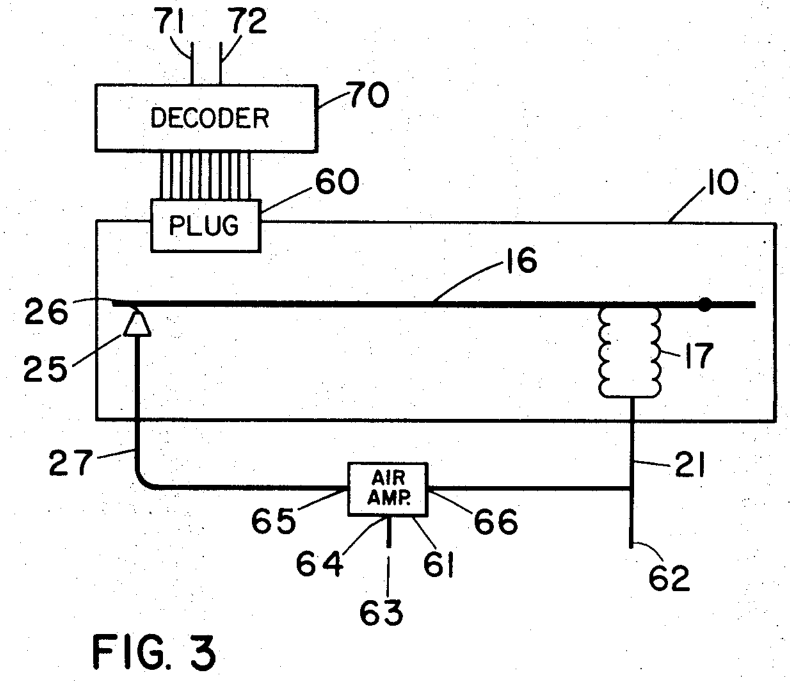
FIG. 3 is a schematic diagram of the converter rebalancing system.

Referring to FIG. 3, the force balancing system producing the pneumatic analog output is shown in block diagramatic form. Converter 10 is interconnected with air pressure amplifier 61, commonly referred to as an air "relay." Air presusre amplifier 61 is a standard device and is readily available as a stock item. A source of air supply 63, illustratively at 20 p.s.i., is furnished to supply input 64 of air amplifier 61. Nozzle supply line 27, which is connected to nozzle 25 on one end, is at its other end connected to nozzle input 65 of air amplifier 61. Force bar 16 throttles orifice 26 of nozzle 25, thereby throttling the flow through line 27 and the back pressure appearing at input 65 or air amplifier 61 is varied accordingly. Illustratively, for travel of .0006 inch between orifice 26 of nozzle 25 and force bar 16, the back pressure appearing at input 65 of air amplifier 61 is varied two or three pounds thereby. Appearing at output 66 of air amplifier 61 is an amplified pressure, illustratively varying from 3–15 p.s.i., roughly proportional to the back pressure appearing at input 65. Output 66 of air amplifier 61 is furnished through line 21 thereby supplying bellows 17, and in addition output 66 is supplied to analog output 62, representing the pneumatic analog equivalent of the binary input to converter 10. Air amplifier 61 functions in a conventional manner with nozzle 25, bellows 17 and force bar 16, in that a force balance is achieved on force bar 16 between bellows 17 on one hand, and by bit weighting fingers 40 on the other hand. Alternatively, other types of nozzle systems may be employed in which, for example, the back pressure produced by the throttling action of force bar 16 at orifice 26 may be converted directly to a pneumatic analog output by a pneumatic one-to-one repeater. Use of a Knobel type nozzle may be one way of implementing such a function. Increased stability may be thereby obtained.

For facilitating the use of the invention some means of transmitting the binary number calculated by the central processor to the converter 10 described above should be provided. To avoid cumbersome cabling runs, a two-wire transmission system is preferred. It is proposed that each bit of the binary number be assigned a respective individual frequency; when a particular bit is a binary "one," the particular frequency assigned to that bit is enabled; when that bit is a binary "zero," its respective frequency is disabled.

Figure 4:
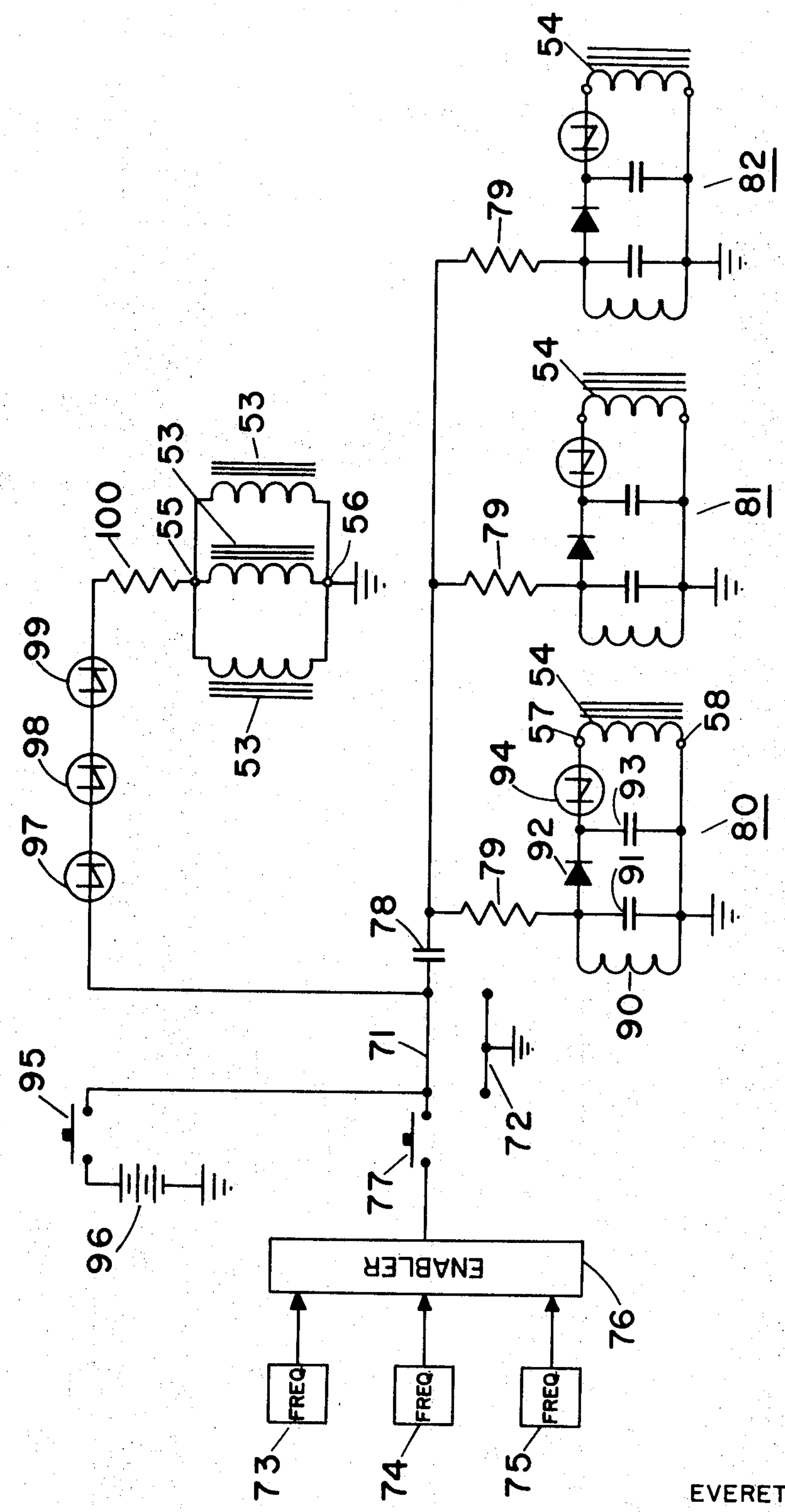
FIG. 4 is a schematic diagram of a two-wire transmission system facilitating use of the invention.

Referring to FIG. 4, decoding apparatus for only the first three bits 30, 31 and 32, are shown for convenience. The decoding apparatus for the remaining bits 33–39 are identical. Any of a group of frequencies 73, 74 and 75, may be selected and combined by frequency enabling apparatus 76 associated with a central processor; the enabled and combined frequencies are connected to two-wire transmission systems 71 and 72 at selected times by "set" switch 77, which may be computer-operated. In this illustration, one wire 72 of the transmission system is the system ground. The combined frequencies are connected from two-wire transmission line 71 and 72, through capacitor 78, to decoding apparatus 70 consisting of respective bit decoding circuits 80, 81 and 82. The enabled and combined frequencies are supplied to the individual decoding circuits 80–82 through their respective isolating and limiting resistors 79. Each tuning circuit for bit decoders 80 through 82 consists of coil 90 and capacitor 91. Oscillations sustained in tuned circuit 90 and 91 by the presence of its resonant frequency on transmission system 71–72 are coupled through rectifying diode 92 to capacitor 93. When the D.C. charge in capacitor 93 builds up sufficiently as a consequence, avalanche diode 94 breaks down coupling the charge in capacitor 93 as a pulse through plug 60 and through leads 57 and 58 therefrom to the respective magnetic winding 54 of the bit assembly connected thereto.

The tuned circuit 90–91 of digit decoding circuit 80 illustratively is resonant at the frequency of oscillator 73, the tuned circuit of bit decoding circuit 81 is resonant at the frequency of oscillator 74, and in a similar manner, the remaining of the ten bit decoding circuits are each resonant to a particular frequency that may be enabled by enabler 76.

At selected times the reset function is performed by reset switch 95, in association with the central processor. Reset switch 95 connects a D.C. potential to transmission line 71–72 thence through avalanche diodes 97, 98 and 99, series resistor 100, through leads 55 and 56, to paralleled reset windings 53 of decoder 10. Capacitor 78 blocks the effect of the D.C. reset voltage from the tuned circuits, and avalanche diodes 97, 98 and 99 prevent the reset winding 53 from responding to A.C. on the two-wire transmission line 71–72. Only when D.C. source 96 is coupled through line 71–72 is a potential sufficiently high thereon to break down diodes 97, 98 and 99. In this manner, all the bit assemblies 30–39 are simultaneously reset to the position where fingers 40 are lifted clear of force bar 16.

The embodiment described above employs electromagnetic actuating means for bit assemblies 30 through 39. Alternative forms of bit assemblies 30 through 39 may be employed with the invention. For example, each bit assembly may consist of a device to place a predetermined weight at a point along force bar 16 appropriate thereto; gravity rather than spring tension is balanced against bellows 17. It will be obvious to one skilled in the art that a wide variety of devices may be employed for applying a predetermined moment of force to force bar 16, with each moment of force representing a particular digit of a binary number.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. Apparatus for converting a binary number having a plurality of digits into an equivalent analog signal comprising, a base member, a force bar pivotally mounted to said base member, a plurality of digit members mounted to said base member and disposed along the length of said force bar with each digit member corresponding to a respective digit of said binary number and each said digit member being adapted to selectively transfer a respective predetermined moment of force therefrom to said force bar with said predetermined moment of force being determined by the combination of the force applied to said force bar by said digit member together with the distance from the pivot of said force bar that force is applied and with said predetermined moment of force upon said force bar representing the significance of the corresponding digit of said binary number with all such transferred moments of force being in the same direction to thereby effectively sum the significances of the digits of said binary number as a total moment of force an said force bar, force balancing means mounted to said base member and disposed to exert force upon said force bar in a direction opposing the moments of force selectively transferred to said force bar by said digit members, a plurality of enabling means each responsive to an energizing signal representing a respective digit of said binary number and each adapted to actuate a respective digit member into operative engagement with said force bar thereby transferring the predetermined moment of force from said respective digit member to said force bar thus contributing to the total moment of force transferred to said force bar by all said digit members in engagement with said force bar, a plurality of disabling means each adapted to actuate a respective digit member out of operative engagement with said force bar thereby removing the effect of said respective digit member from said force bar, and means for supplying the requisite force to said force balance means for counteracting the total moment of force supplied by the selectively engaged digit members thereby to obtain an equilibrium condition for said force bar with said means for supplying the requisite force having an output signal therefrom related to said requisite force thereby representing the analog equivalent of said binary number.

2. The apparatus of claim 1, wherein said moments of force are each adjusted to form a binary series of moments of force by adjusting each said force applied to said force bar by each said digit member.

3. The apparatus of claim 1, wherein said digit members comprise fingers disposed along the length of said force bar with each being flexibly mounted to said base member in a manner to permit selective transfer of its respective predetermined moment of force therefrom to said force bar.

4. The apparatus of claim 3, wherein said plurality of enabling means comprises electromagnets each selectively actuating a respective mechanical device which device in turn enables said finger.

5. The apparatus of claim 4, wherein each device is mechanically retained in the position to which it is electromagnetically actuated.

6. The apparatus of claim 5, wherein each said device is actuated to a disabling position by electromagnetic disabling means.

7. The apparatus of claim 6, wherein said force balancing means comprises a pneumatic bellows and said means for supplying the requisite force to said force balance means comprises a pneumatic output of an air amplifier responsive to a back pressure determined by the throttling action between a portion of said force bar and the orifice of an air nozzle mounted to said base member whereby said pneumatic output of said air amplifier also provides the pneumatic analog output of said apparatus.

8. The apparatus of claim 1 with digit decoding means comprising a plurality of tuned circuits each resonant at a frequency corresponding to a respective digit of said binary number with a plurality of pulse storage and pulse discharge means each responsive to a respective one of said tuned circuits and said pulse storage and pulse discharge means each having an output interconnected with a respective one of said enabling means whereby the energy of oscillations induced in a tuned circuit is utilized to energize its respective enabling means and whereby a plurality of digits of said binary number may be encoded and combined remotely from said apparatus for transmission along a two-wire transmission system to said decoder associated with said apparatus.

References Cited

UNITED STATES PATENTS

| | | | |
|---|---|---|---|
| 2,134,550 | 10/1938 | Eaton | 158—28 X |
| 2,586,972 | 2/1952 | McKenzie | 158—28 X |
| 2,703,606 | 3/1955 | Johnson et al. | 158—28 X |
| 2,889,109 | 6/1959 | O'Brien | 340—347 X |
| 3,025,510 | 3/1962 | Lovejoy | 340—347 |
| 3,225,346 | 12/1965 | Buddenhagen | 340—347 |

MAYNARD R. WILBUR, Primary Examiner

C. D. MILLER, Assistant Examiner